Dec. 27, 1955  H. C. RHODES  2,728,307
CROSS GRAIN DOUGH MOLDING MEANS
Filed Sept. 26, 1952  2 Sheets-Sheet 2
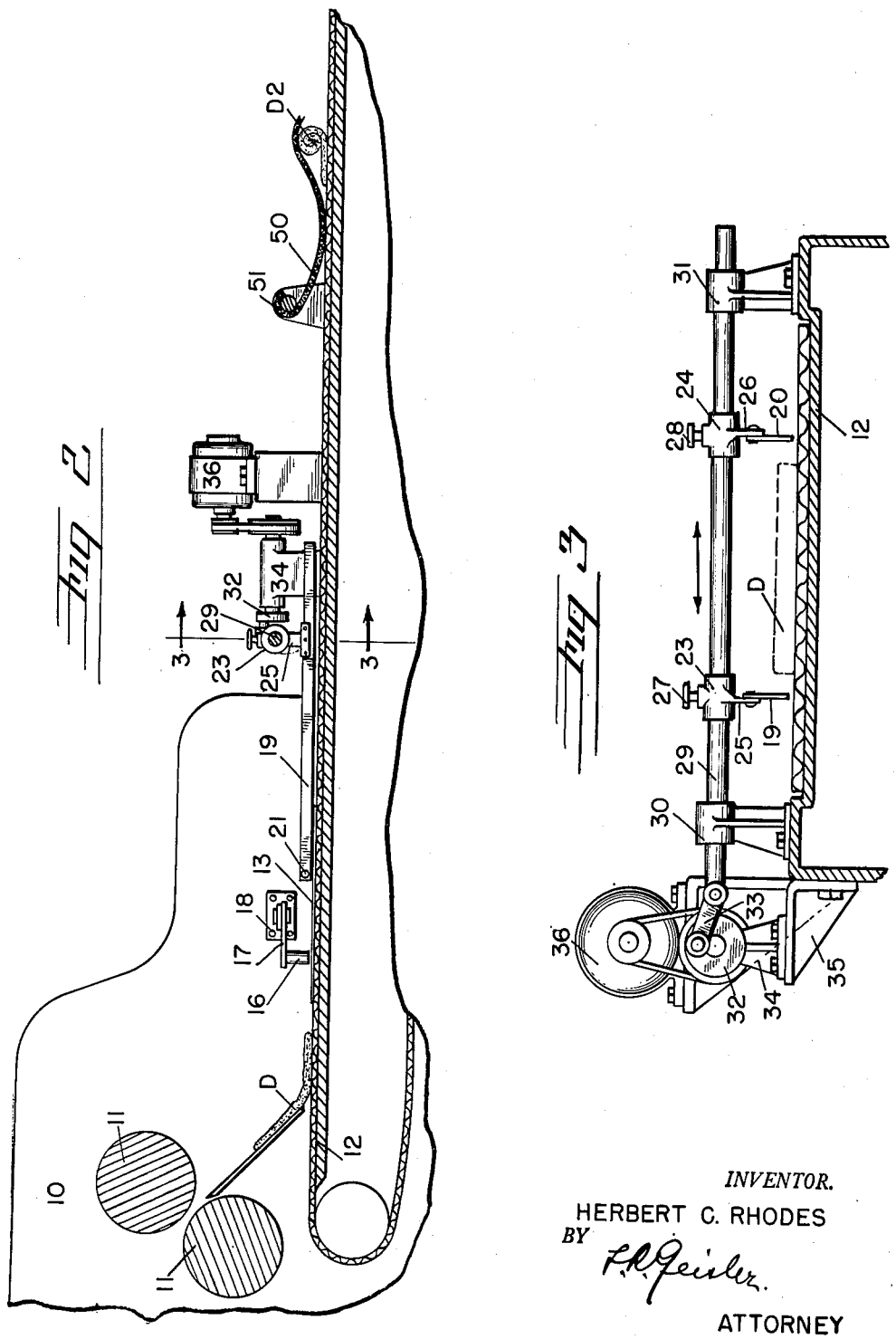
INVENTOR.
HERBERT C. RHODES
BY
ATTORNEY United States Patent Office 2,728,307
Patented Dec. 27, 1955

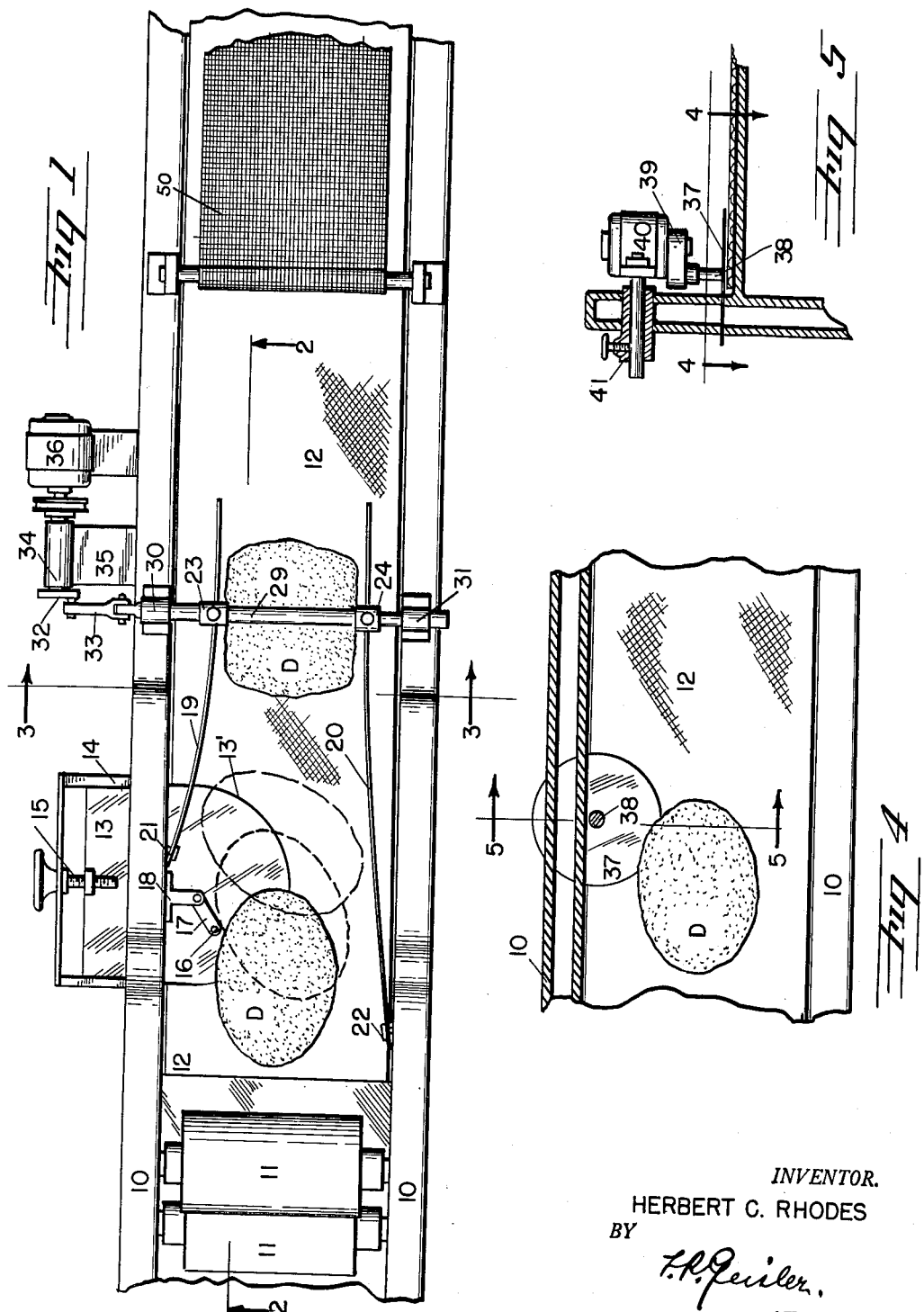

2,728,307

CROSS GRAIN DOUGH MOLDING MEANS

Herbert C. Rhodes, Portland, Oreg., assignor to Read Standard Corporation, a corporation of Delaware Application September 26, 1952, Serial No. 311,615

6 Claims. (Cl. 107—9)

This invention relates to the molding of individual pieces of dough as they are received from the rolls of a dough delivery machine preparatory to the final molding and shaping of the dough pieces and the subsequent depositing of the same into the baking pans.

More specifically this invention relates to cross grain molding of the dough, that is to say, the final molding of the dough in a direction normal to the travel of the dough through the rolls of the dough rolling and delivery machine and thus across the grain which develops in the dough as a result of the initial rolling treatment of the dough in the delivery machine.

The use of so-called "cross grain" dough in bread making (actually with the grain running lengthwise of the loaf instead of crosswise as customary) is now well known and practiced to a considerable extent. The pieces of dough employed for this purpose are turned 90° after leaving the initial dough rolls before the final molding and shaping of the dough for the baking pans, and this has been done heretofore mainly by transferring such dough pieces from one conveyor belt to a second conveyor belt running along at right angles to the first conveyor belt.

An object of the present invention is to provide simple and practical means for turning the dough pieces 90° on the conveyor belt on to which they are received from the rolls of the dough delivery machine without necessitating the transferring of the dough pieces to another conveyor and without requiring any manual handling of the dough.

Another object of the invention is to provide novel means for shaping the dough pieces after such 90° turning so that they will conform to a desired predetermined and uniform size and shape.

A further object of the invention is to provide means for turning and shaping the dough, as above indicated, which can be adjusted for dough pieces of different size, as for example, dough pieces for larger or smaller bread loaves.

An additional object is to provide means which will turn and shape the dough pieces as desired but to which the dough will have no tendency to stick or cling, so that such means will be capable of handling a large number of dough pieces in rapid succession without the necessity of halting the delivery of the dough pieces for the purpose of removing collected bits of dough.

The manner in which my improved cross grain dough molding means is constructed and operated and the manner in which the above objects and other advantages are attained will be readily understood from the following brief description in which reference is made to the accompanying drawings.

In the drawings:

Fig. 1 is a top plan view of my dough turning and shaping means, showing the same mounted above the conveyor leading from the dough delivery machine and in close proximity to the molding rolls of the delivery machine;

Fig. 2 is a longitudinal sectional elevation on line 2—2 of Fig. 1;

Fig. 3 is a transverse section taken on the lines indicated at 3—3 in Figs. 1 and 2, but drawn to an enlarged scale;

Fig. 4 is a fragmentary plan section showing a modification of that portion of the means which causes the turning of the dough pieces, this plan section being taken on line 4—4 of Fig. 5; and Fig. 5 is a fragmentary sectional elevation of the same modification taken on the line 5—5 of Fig. 4.

Referring first to Figs. 1 and 2, my cross grain dough molding means is shown mounted on the extension of the frame sides 10, 10 of the dough molding and delivery machine. The pieces of dough from the dough machine, after passing between the last pair of rolls 11, 11, are deposited in the usual manner on the endless conveyor belt 12 traveling from left to right as viewed in these figures. Such dough pieces are indicated in general by the reference letter D.

Each piece of dough D, when deposited on the conveyor belt 12 from the dough delivery machine, will be in a flat oval or elliptical shape due to passing of the dough pieces between the molding rolls of the delivery machine. Also, as is well known, the "grain" in the dough will run in the direction of the travel of the dough between the rolls, such "grain" being caused by the rolling of the dough. In order to obtain the desired cross grain molding it is necessary first to turn each piece of dough 90°.

A flat plate 13 (Figs. 1 and 2) is slidably positioned in a horizontal slot extending through one side wall 10 and is slidably mounted in a frame 14, the frame being secured in any suitable manner on the outside of one wall 10. The plate 13 is formed of thin metal or other suitable rigid material and is positioned directly on top of the conveyor belt 12 so that pieces of dough on the conveyor belt 12, upon coming into contact with the edge of the plate 13, will move on to and over the plate. The inside edge of the plate is curved, as shown at 13' in Fig. 1 and preferably is semi-circular. The plate extends only partway across the conveyor belt 12 and thus extends only partway into the path of the traveling dough pieces.

An adjusting screw 15 (Fig. 1), mounted on the outer end of the plate-supporting frame 14, extends through a threaded lug in the outer end of the plate 13. Thus the extent to which the plate extends into the path of the dough pieces can be adjusted by means of the screw 15.

A bracket 18 (Figs. 1 and 2) is mounted on the inside face of the side wall 10 above the plate 13, and this bracket supports a horizontal arm 17 which is pivotally secured to the bracket by a screw or other suitable means. A dough-engaging finger 16 is carried by the arm 17 and extends downwardly, terminating very close to the top face of the plate 13 as shown in Fig. 2. The finger 16 can thus be positioned nearer to or further from the adjacent side wall 10 by adjusting the arm 17 in its bracket 18.

As each piece of dough D, moving along on the conveyor 12, comes into contact with the edge of the stationary plate 13 it moves up on to the plate. Since the plate extends only partway across the path of the traveling dough (the plate 13 should never extend more than half way across the conveyor 12), only a portion of the piece of dough will move on to and over the plate 13. Due to the fact that the plate 13 is stationary and that the conveyor is constantly moving, the movement of a portion of the dough piece will be retarded by the plate while the remaining major portion of the dough piece continues to travel along with the conveyor belt. As a consequence the dough piece will swing around (counterclockwise as viewed in Fig. 1) as it moves along with the conveyor belt while a portion of the dough piece slides more slowly over the plate 13 until it leaves the plate. If the plate is positioned a proper distance out over the conveyor and in the path of the moving dough, the dough piece will be turned the desired 90° by the time it is entirely free of the plate.

While the turning of the dough pieces 90° under most circumstances could be accomplished by the plate 13 alone, provided the plate is of the proper size and the distance which it extends out over the conveyor is properly adjusted, I have found that the use of the dough-engaging finger 16 is an additional and desirable aid in obtaining uniform turning of the successive dough pieces.

Since some of the dough pieces when deposited on the conveyor belt 12 from the dough delivery machine, may be positioned nearer one side of the machine than the other, there would be the possibility that a dough piece might be caused to ride too far over on the plate 13. However, such possibility is prevented by the dough-engaging finger 16. Furthermore the finger 16, upon its initial contact with the edge of the dough piece, causes a turning impetus to be imparted to the dough piece since such engagement momentarily halts the travel of the engaged dough edge until the dough piece begins to turn. The position of the engaging finger 16 must be adjusted for dough pieces of different size just as the position of the plate 13 must be adjusted under similar circumstances.

The plate 13 should be made of material to which the dough will not have a tendency to stick. For this reason ordinary steel is better than stainless steel for the plate. There are also many other materials which are very suitable for the plate, such leucite, Teflon, and some recently developed materials which are well known and commonly used in baking machinery.

When the dough pieces have been turned the desired 90° it is then necessary to re-shape or re-mold them in order to reduce them to the proper length for the baking pans. This re-shaping I accomplish with a pair of thin flexible resilient strips 19 and 20 which I designate as dough end molders and which are located at opposite sides as shown in Fig. 1. The ends of these strips 19 and 20 which are nearer the delivery rolls 11, 11 are secured to the respective side walls as indicated at 21 and 22 respectively, the end of the strip 19 being secured at a further distance from the rolls 11, 11 than the other strip 20 so as not to interfere with the positioning finger 16 or the passing of the dough piece on to the plate. Both strips 19 and 20 extend inwardly along and above the respective marginal areas of the conveyor belt 12 until the final distance between the strips corresponds to the desired size to which the dough pieces are to be reduced. The strips are supported above the conveyor from the bracket arms 25 and 26 respectively (Fig. 3) on the sleeves 23 and 24 respectively, which sleeves are mounted on a shaft 29. The shaft 29 is slidable axially in a pair of bearing supports 30 and 31 which are secured on opposite sides of the machine frame. The sleeves 23 and 24 are adjustable on the shaft 29 so that the spacing between the strips or dough end molders 19 and 20 can be adjusted to suit requirements, and the sleeves 23 and 24 are secured on the shaft in adjusted relative positions by suitable means such as the thumb screws 27 and 28 respectively.

In the molding or shaping of dough, when such shaping requires compressing the opposite sides or ends of the dough while the dough is resting on a conveyor belt or other flat surface, I have found that this can be accomplished most satisfactorily if the compressing members are made to vibrate laterally during their contact with the dough. The contact by vibrating compressing members with the dough not only prevents the dough from having a tendency to adhere to the members or from being held against travel with the conveyor due to its compression between the members, but such vibratory contact with the dough also aids in leveling the top face of the dough as the dough is compressed. Since each re-shaped dough piece is substantially rolled up in the customary manner prior to being deposited in the baking pan, the top face of the re-shaped dough piece should be kept fairly level to facilitate the rolling up of the dough. Such final rolling up of a piece of dough is illustrated on the right in Fig. 2. A customary way in which this is accomplished is to have the flat piece of dough on the conveyor pass under a flexible dough-engaging element 50, such as a metal chain mesh, one end of which element 50 is secured to a transverse stationary shaft 51 extending over and above the conveyor while the remaining portion of the element 50 is left free and will drag on the conveyor until contacted by the dough piece. Then the contact of the moving flat piece of dough with the element 50 will cause the dough to roll up as illustrated at D2, in which rolled up shape it is then ready to be deposited in the baking pan.

The re-shaping of these dough pieces by the vibrating strips or dough end molders 19 and 20 is an important feature in my device. Not only do these adjustable vibrating strips 19 and 20 reshape each dough piece to the desired size but, by making the two contacted edges of the dough piece substantially straight and parallel, which edges form the ends of the rolled up piece of dough D2 (Fig. 2) placed in the baking pan, the dough in the baking pan will have ends which are substantially straight walls without any large pockets, air cavities or other irregularities, and the ends of the resulting loaf of bread will be more uniform as a result and the end portions of the loaf will not have enclosed oversize air holes.

In order to impart the necessary vibratory motion to the strips or members 19 and 20, I attach an end of the shaft 29 to a crank wheel 32 by means of the link 33. The crank wheel 32 is secured on a shaft mounted in a bearing support 34 which in turn is supported on a suitable bracket 35 (Fig. 3) on the side of the machine. Suitable belt and pulley connection with a motor 36 for producing rotation of the crank wheel shaft and crank wheel will result in the axial reciprocation of the shaft 29 and cause the lateral vibratory movement of the members or dough end molders 19 and 20.

Instead of using the stationary plate 13 of Fig. 1 it is possible to turn the dough pieces by using a small rotating plate such as the plate 37 illustrated in Figs. 4 and 5. In this modification of my device the dough contacting plate 37 is supported on the bottom end of a shaft 38 which is located adjacent the side frame of the machine so that the plate 37 will not extend out as far over conveyor belt 12 as the stationary plate 13 previously described. The rotating plate 37 is positioned close above the conveyor belt and is rotated in clockwise direction, as viewed in Fig. 4. The plate supporting shaft 38 is mounted in suitable bearings in a gear box 39 (Fig. 5) containing a gear connection with a motor 40, the motor and gear box being supported from a suitable bracket 41.

Minor modifications might be made in the mounting or arrangement of either the stationary plate or rotating plate used in my device for turning the dough pieces the required 90°, without departing from the principle of my invention, and similarly various modifications in the mounting of the dough end molders and in the means for vibrating them would be possible.

I claim:

1. In a device of the character described, a traveling belt conveyor adapted to receive sheeted pieces of dough from a dough sheeting means, a rotating plate extending part way across said conveyor in the path of said dough pieces so as to cause a portion of each dough piece to be obliged to pass over said plate while such dough piece is being moved along by said conveyor, whereby travel of the portion of the dough piece passing over said plate will be momentarily retarded by said plate while the remaining portion of the dough piece is moved at normal speed thus causing the dough piece to turn until the dough piece has moved off of said plate, and means for rotating said plate in a direction opposed to the travel of said conveyor.

2. In a dough molding machine, a traveling belt conveyor adapted to receive sheeted pieces of dough from a dough sheeting means, dough-molding rolls delivering dough pieces onto said conveyor, a pair of flexible dough end molders extending forwardly along over the side portions of said conveyor respectively in the direction of travel of the dough pieces and adapted to subject the dough pieces to lateral compression as the dough pieces pass between said dough end molders, means for securing the upstream ends of said dough end molders against bodily displacement to a stationary part of said dough molding machine, and means connected with the downstream end portions of said dough end molders for imparting lateral vibration to said dough end molders to facilitate the compressing and shaping of the dough pieces.

3. A dough molding machine in accordance with claim 2, wherein said dough end molders converge from their upstream toward their downstream ends.

4. In a dough molding machine, a straight endless belt conveyor for supporting sheeted dough pieces on the top surface thereof while continuously transporting them in a straight path extending from one end portion to the other of said belt conveyor, means for delivering sheeted dough pieces onto said one end portion of said belt conveyor in a path of movement linearly alined with the direction of movement of said belt conveyor, a plate-like member disposed forward of and spaced from the discharge end of said sheeted dough piece delivery means and extending from a side edge of said belt conveyor transversely to the direction of travel of said belt conveyor partially across the width thereof, said plate-like member overlying the top surface of said belt conveyor in close proximity thereto, said plate-like member lying only partially in the path of sheeted dough pieces transported from the said one end portion of said belt conveyor so as to cause a side portion only of each sheeted dough piece to be obliged to pass over said plate-like member while such dough piece is being transported by said belt conveyor, whereby travel of the portion of the dough piece passing over said plate-like member is momentarily retarded while the remaining portion of the dough piece is moved by said belt conveyor at belt conveyor speed to cause the dough piece to turn until it has moved off of said plate-like member.

5. A dough molding machine in accordance with claim 4 including, a dough piece engaging finger positioned above the top face of said plate-like member for deflecting misaligned dough pieces across a desired inner portion of said plate-like member.

6. A dough molding machine in accordance with claim 5 including means for adjusting the distance to which the plate-like member extends out over said belt conveyor and means for adjusting the position of said dough engaging pin relative to said plate-like member.

References Cited in the file of this patent

UNITED STATES PATENTS

| | | |
|---|---|---|
| 793,155 | Piper | June 27, 1905 |
| 883,370 | Wood | Mar. 31, 1908 |
| 936,660 | Petri | Oct. 12, 1909 |
| 1,669,220 | Thropp et al. | May 8, 1928 |
| 1,763,620 | Wolfarth et al. | June 10, 1930 |
| 2,471,112 | Maull et al. | May 24, 1949 |
| 2,479,864 | Rhodes | Aug. 23, 1949 |

FOREIGN PATENTS

| | | |
|---|---|---|
| 15,545 | Great Britain | July 19, 1907 |
| 21,480 | France | July 6, 1920 |
| (1st addition to No. 501,285) | | |
| 138,676 | Great Britain | Feb. 19, 1920 |
| 501,285 | France | Jan. 21, 1920 |
| 581,723 | Germany | Aug. 1, 1933 |